United States Patent [19]

Nakano et al.

[11] Patent Number: 5,191,580
[45] Date of Patent: Mar. 2, 1993

[54] COMMUNICATION RESPONSE CONTROL METHOD

[75] Inventors: Yasushi Nakano; Yasuhira Tanaka, both of Kobe, Japan

[73] Assignee: Mitsubishi Denki Kabushiki Kaisha, Tokyo, Japan

[21] Appl. No.: 596,821

[22] Filed: Oct. 12, 1990

[30] Foreign Application Priority Data

Oct. 14, 1989 [JP] Japan .................................. 1-267151

[51] Int. Cl.⁵ .............................................. H04J 3/16
[52] U.S. Cl. .................................. 370/85.5; 370/85.4; 370/85.15; 340/825.05
[58] Field of Search ................... 370/85.4, 85.5, 85.6, 370/85.15, 94.1, 94.2; 340/825.05, 825.5, 825.51

[56] References Cited

U.S. PATENT DOCUMENTS

| | | | |
|---|---|---|---|
| 4,454,508 | 6/1984 | Grow | 340/825.05 |
| 4,930,121 | 5/1990 | Shiobara | 370/85.4 |
| 4,998,246 | 3/1991 | Tanaka | 370/85.5 |
| 5,065,397 | 11/1991 | Shiobara | 370/85.5 |
| 5,068,849 | 11/1991 | Tanaka | 370/85.5 |

FOREIGN PATENT DOCUMENTS

| | | |
|---|---|---|
| 3643979 | 6/1988 | Fed. Rep. of Germany . |
| 3844395 | 5/1990 | Fed. Rep. of Germany . |
| 2-235458 | 9/1990 | Japan . |

OTHER PUBLICATIONS

"FDDI Token Ring Media Access Control-Mac" Draft Proposed American National Standard, Feb. 28, 1986.

Primary Examiner—Douglas W. Olms
Assistant Examiner—Alpus H. Hsu
Attorney, Agent, or Firm—Rothwell, Figg, Ernst & Kurz

[57] ABSTRACT

A communication response control method for distributing, from a specific station with the TTRT value (Target-Token Rotation Time) to be set, the TTRT values for all the other stations and forcibly seating the specific station to an arbitration mode in order to set the TTRT values of the whole network. As a result, the desired TTRT values can be set from any station on the network, dispensing with the trouble of setting the TTRT values for the respective stations, and allowing communication response control in cyclic data transmission and event transmission to be more simplified.

2 Claims, 8 Drawing Sheets

Prior Art

Fig. 2(b)

Prior Art

Fig. 3(a)

Prior Art

Fig. 3(b)

Prior Art

Fig. 4(a)

Prior Art

Fig. 4(b)

Prior Art

Fig. 4(c)

Prior Art

Fig. 4(d)

Prior Art

Fig. 4(e)

Prior Art

COMMUNICATION RESPONSE CONTROL METHOD

BACKGROUND OF THE INVENTION

Field of the Invention

The present invention relates to a communication response control method, and more in particular, to a communication response control method which is capable of setting any target-token rotation time on a network by arbitrating operation of a station being connected to the network.

Description of the Related Art

Recently, a local area network (LAN) has been well known as a network which connects a plurality of independent units with each other.

In the LAN, one transmission line is used by a plurality of stations (terminals) so as to enable communication. In this system it is necessary to control data which is transmitted from each of the stations in order to prevent the data from being destroyed. As one of control methods of preventing such data destruction, there is a token-access method which will be described below.

According to this token-access method, each of the stations is connected one after another so as to construct a transmission line in the form of a ring, and a specific frame which is called a token is rotated on the ring so as to transmit and receive an access authority to and from a transmission medium. In other words, a station in which a request-to-send was generated waits and captures the token which comes rotating ensuring the access authority to the ring.

Thereafter the station sends a data frame which is desired to transmit, and after the transmission is finished, the station sends the token and gives the access authority to a station located at a downstream side thereof. As can be seen from the above description, destruction of data to be transmitted between the stations can be avoided by transmitting and receiving the access authority to the ring via the token.

Figure 1:
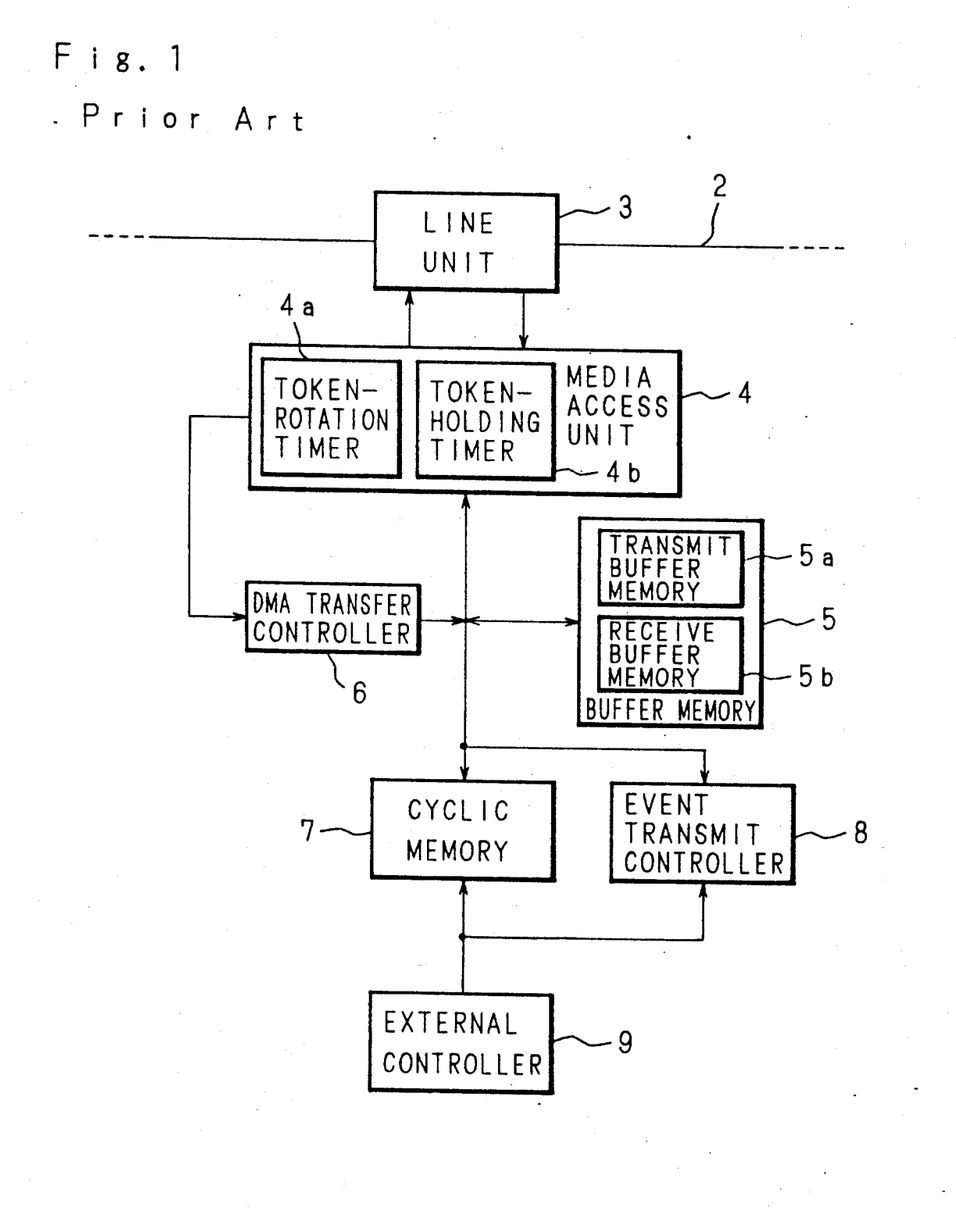
FIG. 1 is a block diagram to illustrate by way of example construction of a station of the conventional control data way.

FIG. 1 is a block diagram to illustrate by way of example construction of a station of the conventional control data as shown in Japanese Patent Application Laid-Open No. 2-235458 (Sept. 18, 1990), for example.

The construction of the station shown in FIG. 1 will be described below.

The station shown in FIG. 1 consists of a line unit 3 which is connected to a line 2 in the form of a ring, a media access unit 4 with both a token-rotation timer 4a and a token-hold timer 4b, a buffer memory 5 with both a transmit buffer memory 5a and a receive buffer memory 5b, a DMA transfer control unit 6, a cyclic memory 7, and an event transmit control unit 8, and the station is connected to an external controller 9.

Figure 2A:
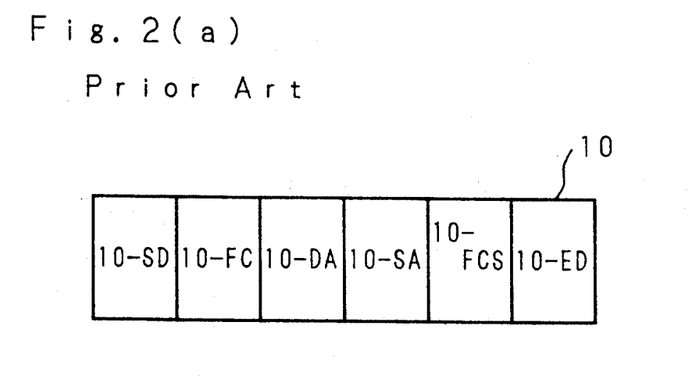
FIG. 2(a) and FIG. 2(b) are schematic views to illustrate construction of a field of the conventional communication frame.
Figure 2B:
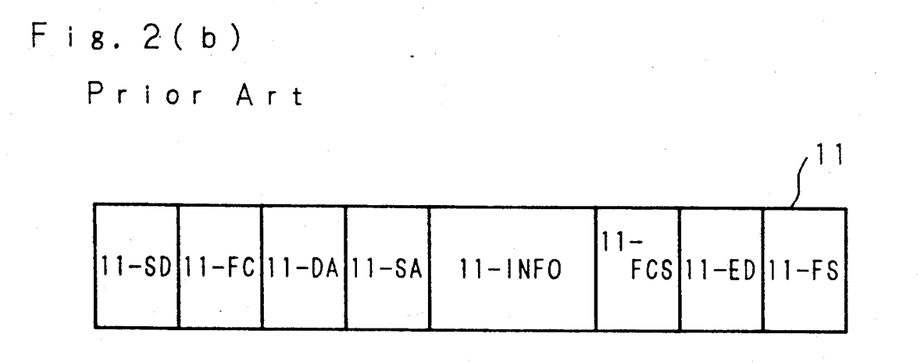

FIGS. 5. 2(a) and 2(b) show construction of the conventional frame.

FIG. 2(a) shows construction of a field of a token frame 10, in which numerals and characters represent the following elements: 10-SD, start delimiter; 10-FC, frame control; 10-DA, destination address; 10-SA, source address; 10-FCS, frame check sequence; and 10-ED, end delimiter.

FIG. 2(b) shows construction of a field of a data frame 11, in which numerals and characters represent the following elements: 11-SD, start delimiter; 11-FC, frame control; 11-DA, destination address; 11-SA, source address; 11-INFO, information area; 11-FCS, frame check sequence; 11-ED, end delimiter; and 11-FS, frame status.

The operation of the station shown in the block diagram of FIG. 1 will be referred to below with reference to FIGS. 2(a) and 2(b).

When any one of stations captures the token frame 10, the station obtains an authority to transmit the data frame 11. At this time, the value of the token-rotation timer 4a shown in FIG. 1 is copied in the token-hold timer 4b, while the token-rotation timer 4a is reset to initiate the time again.

The station which obtained the transmission authority has already been queued by the transmission buffer memory 5a and then transmits the station's own transmission cyclic data which is waiting before transmit as synchronous data.

While this synchronous data is being transmitted, timing of the token-hold timer 4b is being stopped. And after the transmission of the sychronous data was finished, timing of the token-hold timer 4b is initiated. And when transmission of asynchronous data is being queued, it is possible to transmit the asynchronous data until the token-hold timer 4b is counted down to indicate the value "0", that is, until time-out.

By this conventional method, the transmission cyclic data in each station which is transmitted by obtaining one token as the synchronous data is fixed and the total of the synchronous data in the whole loop which is transmitted per one token is set to be always constant.

As a result, a token-rotation time (TRT) when the token is obtained becomes longer than the total time of the synchronous data of the whole ring to be transmitted (TS). Consequently, any station can not transmit the asynchronous data for more than a duration (TTRT−Td−Ts) which is obtained by subtracting both the delay time (Td) necessary for the token to rotate one cycle of the transmission line in the form of the ring and the above time Ts from the target-token rotation time (TTRT). In this case, the time TRT is limited by the time TTRT, and then the time TRT becomes equal to the time TTRT.

Figure 3A:
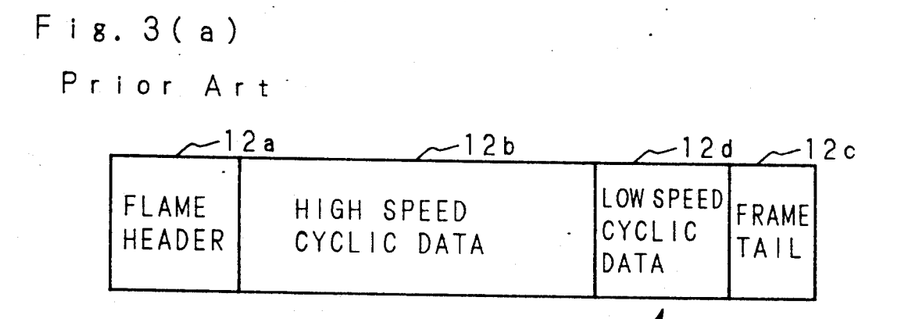
FIG. 3(a) and FIG. 3(b) are schematic views to illustrate construction of a field of the conventional synchronous frame.
Figure 3B:
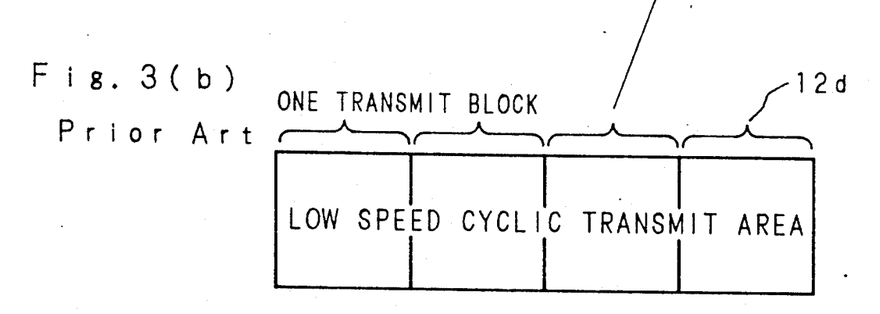

The synchronous frame in each station which is transmitted by obtaining one token is comprised of high-speed cyclic data 12b and one portion of low-speed cyclic data 12d as shown in a diagram to illustrate the synchronous frame of FIGS. 3(a) and 3(b). As a result, the low-speed cyclic data 12d cyclically changes fixed-length data which is put on the synchronous frame so that transmission of the whole data can be finished by transmitting several times of the synchronous frame. Accordingly, the length of this fixed-length data is decided according to a ratio of a high-speed cyclic update cycle to a low-speed cyclic updata cycle.

Now will be described below the conventional method of arbitrating the target-token rotation time (hereinafter referred to as TTRT).

FIG. 4 (a) through FIG. 4 (e) are views to illustrate construction of a network to explain the method of setting the TTRT values in the conventional network, which method is mentioned in "FDDI TOKEN RING MEDIA ACCESS CONTROL-MAC", DRAFT PROPOSED AMERICAN NATIONAL STANDARD, Feb. 28, 1986.

Figure 4A:
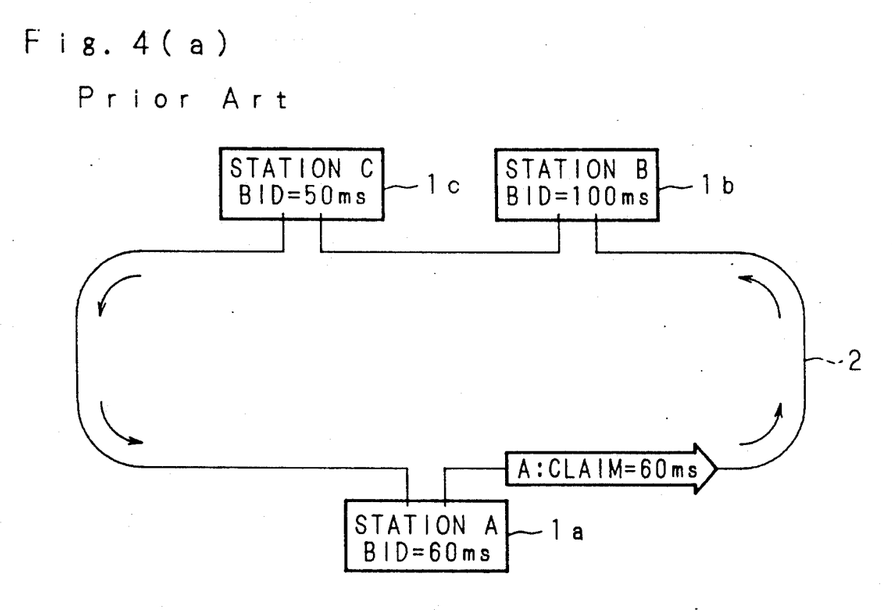
FIG. 4(a) through FIG. 4(e) are schematic views to explain by way of example a method of setting the TTRT values in the conventional network.
Figure 4B:
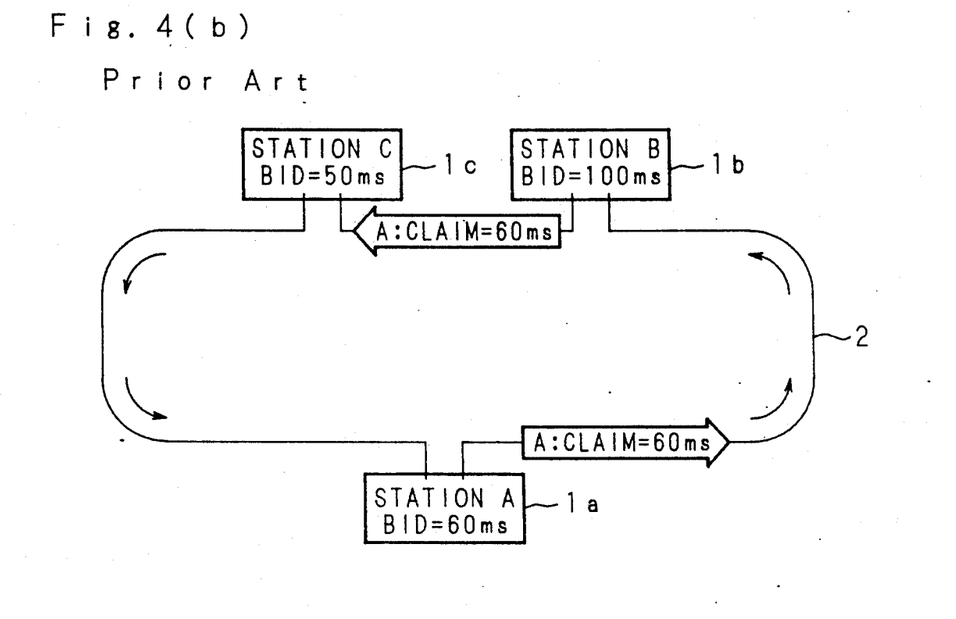

In FIG. 4(a), any one of stations A, B, C (1a, 1b, 1c) which detects a request to initialize (or reinitialize) the line 2 begins arbitrating operation of the TTRT values. In this arbitrating operation, one or more stations bids an initialization authority of the ring by continuously transmitting the arbitrated frame (claim frame).

In the past, only where the TTRT values on the network are more than the station's own TTRT value, arbitration is executed by allowing the station to be as an arbitration mode. In the station B (1b) of FIG. 4(b), for example, a comparison between 60 ms of a received bidden value BID and station B's bidden value of 100 ms is made. In this case, because the TTRT value of the station B's is larger, the station B (1b) will not be the arbitration mode. On the other hand, in the station C (1c) of FIG. 4(c), because 60 ms of the TTRT value on the network is larger than 50 ms of the TTRT value of the station C, the station C is made to be the arbitration mode to execute arbitration.

As may be seen from the above description, while the station which received the high-order bidden value transmits the received bidden value intact, the station which received the low-order bidden value must transmit its own bidden value. The contended bidden value is decided according to the order of priority of such arbitration hierarchy as described below.

Figure 4C:
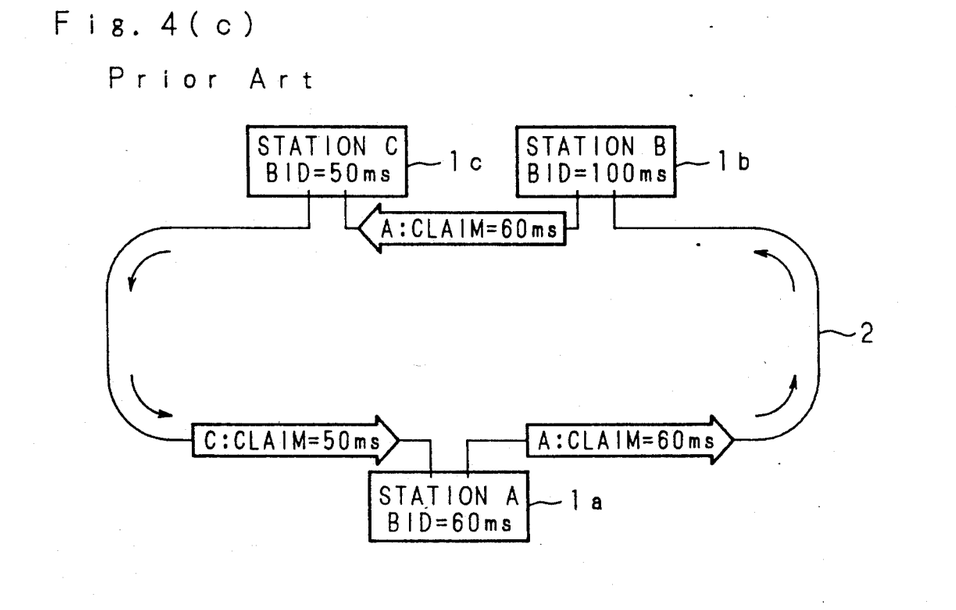
Figure 4D:
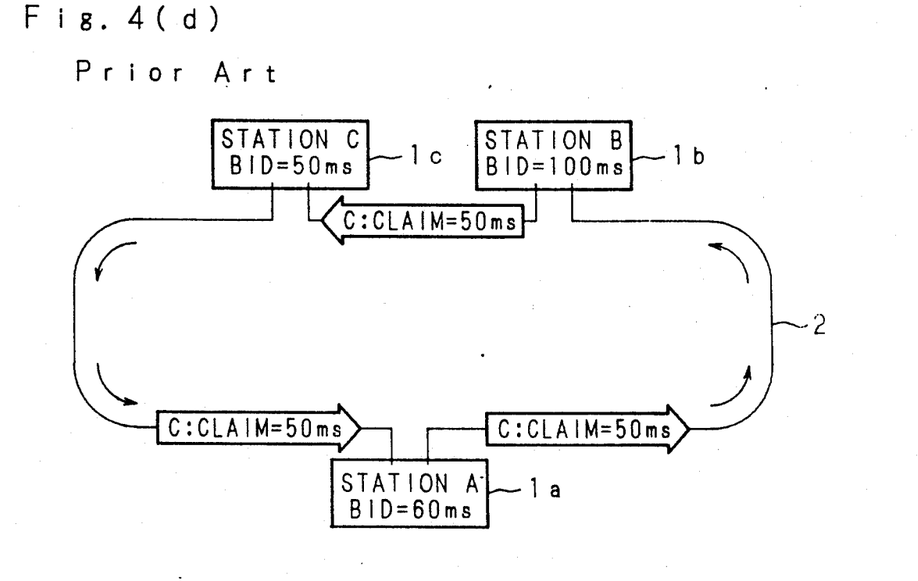
Figure 4E:
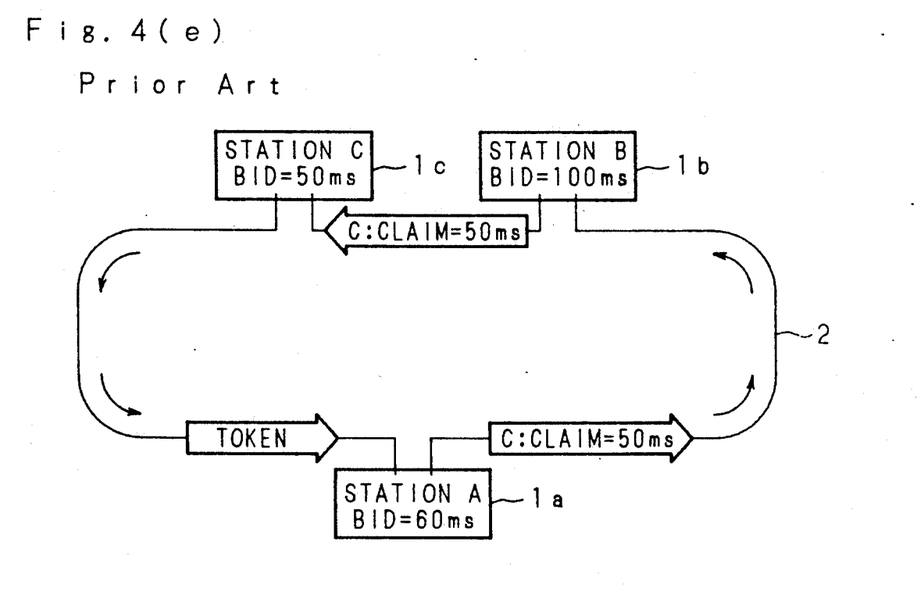

The first priority is given to a bidden value with the lowest TTRT value (50 ms of station C in FIG. 4(a) (FIG. 4(c), (d)).

The second priority is given to a bidden value with the longest address in the case where the same T Bid values (TTRT values to be bidden) are given.

The third priority is given to a bidden value with the highest address in the case where the same T Bid values are given and L (set-up time of a frame to be transmitted) is equal.

The above arbitrating operation is finished when a frame which was generated by one station rotates around the ring and returns to receive the frame which was arbitrated by the station itself (FIG. 4(d)). According to this arbitration, the TTRT values of the network are set to 50 ms of the station C (1c) which is the lowest value.

As described above, the line 2 is filled with frames which we are arbitrated in each of the stations and all the other stations are evacuated. The station which won the contended bid (station C here) begins to initialize the ring, generating a token (FIG. 4(e)).

By the conventional communication response control method being thus constructed, when the TTRT values are set from the each station on the network, when there is a station with the TTRT value smaller than the TTRT value to be set, the TTRT value to be set is set to the value of that station. As a result, where communication response in cyclic data transmission and event transmission is controlled, each one of the TTRT values in the whole stations on the network must be set, which resulting in a problem of giving a lot of trouble.

SUMMARY OF THE INVENTION

The foregoing problem is solved in accordance with the present invention. The present invention is directed to provide a communication response control method which can set from a specific station on a network a desired TTRT values for all the stations connected to the network.

The communication response control method in accordance with the present invention distributes, from a specific station with the TTRT value to be set, the TTRT values for all the other stations and forcibly allows the specific station to be an arbitration mode, setting the TTRT values of the whole network. As a result, by the method of the present invention, the desired TTRT values can be set from any station on the network, then, the troubles of setting the TTRT values for the respective stations can be saved and control of communication response in the cyclic data transmission and event transmission can be more simplified.

The above and further objects and features of the invention will more fully be apparent from the following detailed description with accompanying drawings.

DESCRIPTION OF THE PREFERRED EMBODIMENTS

Now will be referred to a preferred embodiment of the communication response control method in accordance with the present invention with reference to the attached drawings.

Figure 6A:
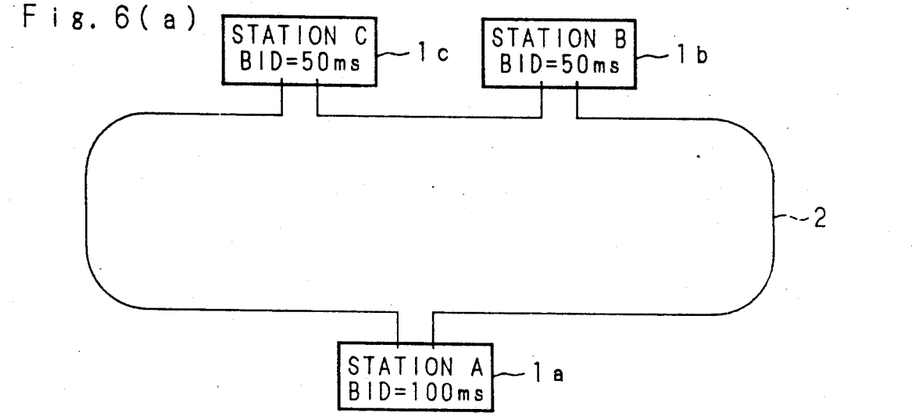
FIG. 6(a) through FIG. 6(c) are schematic views to explain by way of example a method of setting the TTRT values in accordance with a method of the present invention.
Figure 6B:
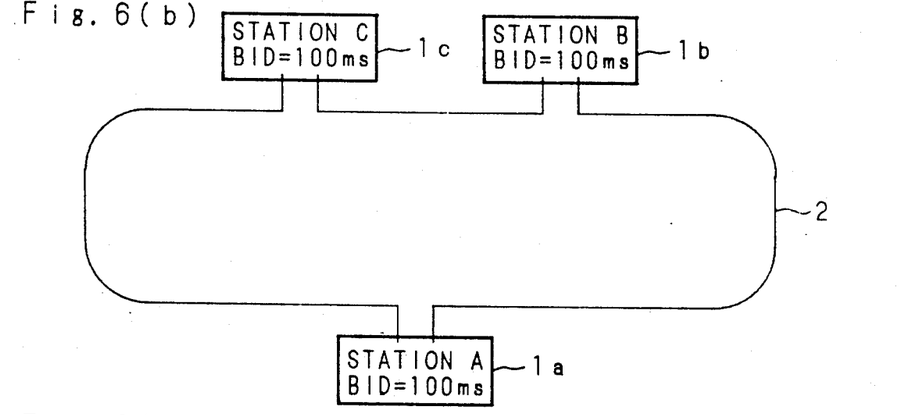
Figure 6C:
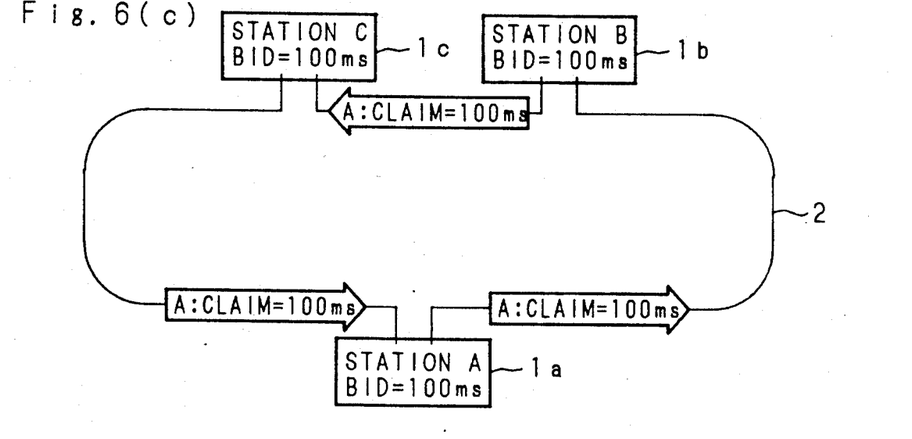

FIG. 6(a) through FIG. 6(c) are views of construction of a network to explain a method of setting the TTRT values on the network in one embodiment of the present invention.

In FIG. 6(a) through FIG. 6(c), a station A (1a), a station B (1b), and a station C (1c) are connected to a line 2 of a transmission line in the form of a ring.

Figure 5:
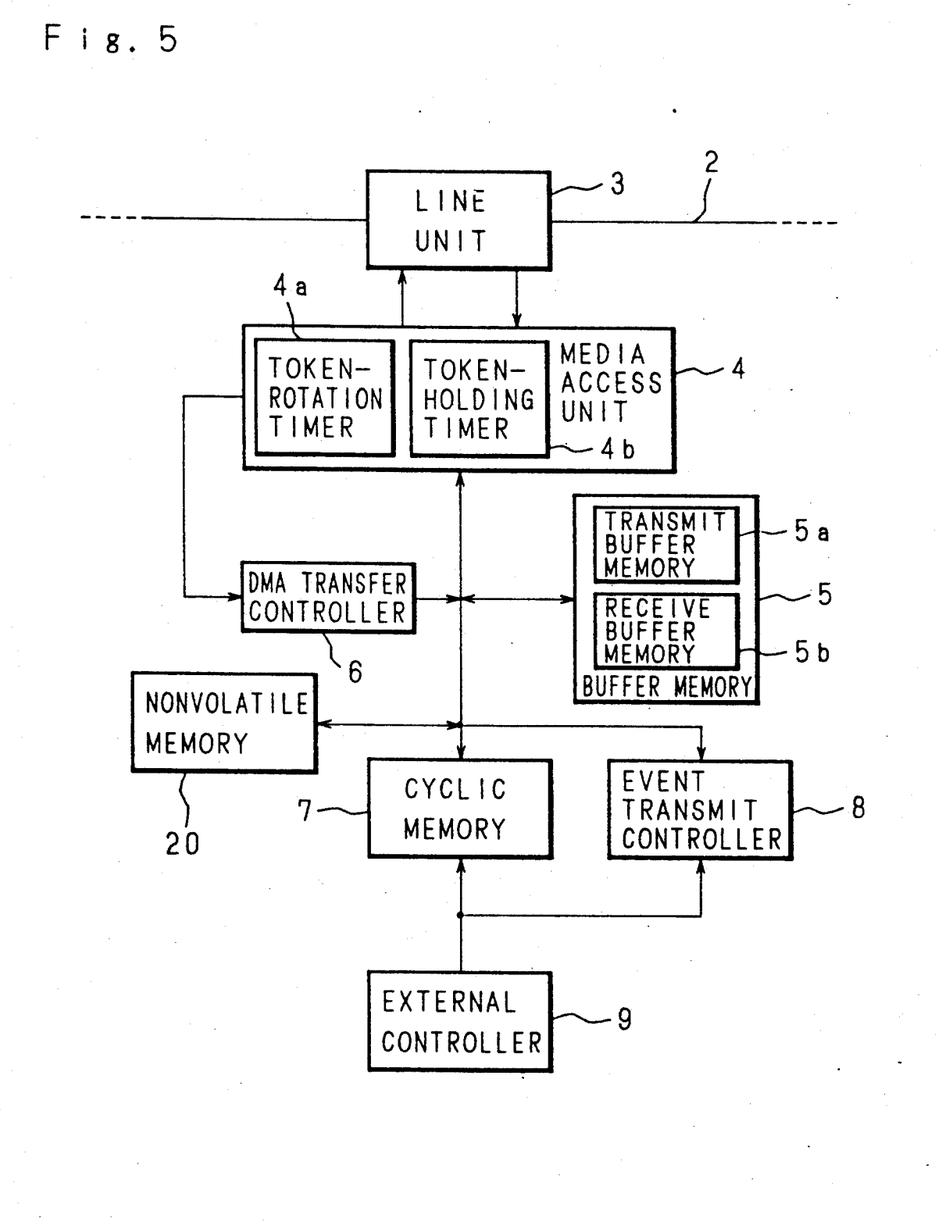
FIG. 5 is a block diagram to illustrate by way of example construction of a station being applied a communication response control method of the present invention.

Construction of each stations in this embodiment are basically similar to the conventional constructions of the stations shown in FIG. 1 as shown in FIG. 5, and constructions of a token frame, a data frame, and a synchronous frame of this embodiment are similar to the conventional constructions of those shown in FIG. 2(a), FIG. 2(b), FIG. 3(a) and FIG. 3(b).

In addition, each station is provided with a nonvolatile memory 20 as a nonvolatile storing means in the construction for the present invention shown in FIG. 5.

By the conventional method, when the TTRT values on the network are set, only in the case where the TTRT value of one station is larger than the TTRT value of the next station, that the station is made to an arbitration mode as described above. As a result, the smallest value of the TTRT values on the network in each station is set on the network.

By the method of the present invention, however, irrespective of the TTRT values in other stations, the TTRT value of the specific station with the TTRT value to be set is distributed to other stations so that the TTRT values can be adapted to be selectively set from any station on the network. And the specific station is forcibly made to the arbitration mode, and the TTRT values for all the stations on the network are set.

Now will be described below operation of the communication response control method which sets desired TTRT values for the whole network.

In the network shown in FIG. 6(a), 50 ms of the TTRT value is being set at present. When it is desired to change the whole network to 100 ms of the TTRT value, 100 ms of the TTRT value is set for the station A (1a) first.

Owing to this setting, as shown in FIG. 6(b), the TTRT value (100 ms) is distributed from the station A (1a) via the line 2 to each of the station B (1b) and the station C (1c).

Operations of setting and distributing this TTRT value will be explained with reference to the block diagram of FIG. 5. The TTRT value to be set enters from the external controller 9 to the cyclic memory 7 and goes through both the media access unit 4 and the line unit 3, followed by being distributed to other stations. In this state, the TTRT values of the whole network are not changed yet.

And the station A (1a) is forcibly made to the arbitration mode by the external controller 9 of FIG. 5. Then, the station A (1a) forcibly carries oiut arbitration by using the above-mentioned 100 ms of the TTRT value which was distributed to each of the station B (1b) and station C (1c). As a result, the TTRT values of the whole network can be changed to 100 ms as shown in FIG. 6(c).

In addition, the set TTRT is stored in the nonvolatile memory 20. When each station re-enters the network after resetting of the system, cutting off power source, or leaving away of each station, previously set TTRT stored in the nonvolatile memory 20 is set as new TTRT, so that resetting of TTRT from the external controller 9 is not need.

In accordance with the above embodiment, even if there is a station which has the TTRT value smaller than the TTRT value to be set in the network as in the conventional embodiment, irrespective of this value, the TTRT values of the whole network can readily be set to desired values from the specific station.

Specifically, where a station can not set the whole network to the TTRT values to be set in the conventional embodiment, it is necessary to provide operation to set the respective TTRT values for the whole stations.

In accordance with the present invention, however, setting the TTRT values for the whole stations on the network can be done only by setting those values from the specific station, which resulting in largely eliminating the trouble of setting the TTRT values as compared to that in the conventional embodiment.

As a result, control of communication response in the cyclic data transmission and event transmissions can readily be carried out, realizing the data transfers with good communication response.

It is not intended that arrangement of stations be limited to that three stations are being connected with each other on the network in the above embodiment. Other suitable arrangement, such as that a plurality of stations excepting the above number of stations are being connected with each other, may be employed to have the same or similar advantage to this embodiment.

In addition, the greater the number of stations which are connected to the network, the wider the difference of easiness of the setting operation of the TTRT values in this embodiment and that in the conventional embodiment.

As described above, by the communication response control method in accordance with the present invention, when the TTRT values on the network are set, the network can be set to desired TTRT values from the specific station among the stations connected to the network, then, the TTRT values can readily be set as compared to the conventional method, accordingly, control of communication response in the cyclic data transmission and event transmission can readily be carried out.

In addition, after setting of the TTRT for whole the network, as the set TTRT is stored in the nonvolatile memory 20, each station automatically resets the TTRT by reading it from the nonvolatile memory 20 in the case where power source is cut off, whole the network is reset, or each station leaves away from the network. Accordingly, there is no need to reset the TTRT from the out side of the network.

The nonvolatile memory is used in abovementioned embodiment, but, for example, a battery back-up memory can be used instead of the nonvolatile memory.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A communication response control method for controlling transmission and reception of control data in a plurality of stations, each of said stations being connected to one another by a transmitting line forming a closed loop and each of said stations being connected to an external controller, and for transmitting, when each station obtains a token, a synchronous frame which is being queued in a transmitting buffer memory of each station, and for executing arbitration so that a station in a predetermined state is made under an arbitration mode to set a target-token rotation time of the network when said transmitting line is activated, comprising the steps of:

(a) distributing a set value of said target-token rotation time of the network from a specific station to all the other stations via said transmitting line;
   (b) forcibly setting said specific station to the arbitration mode by control of said external controller; and
   (c) setting said set value as a target-token rotation time of all said stations in said network.

2. The communication response control method as set forth in claim 1, further comprising steps of:

(a) storing the target-token rotation time as said set value in a nonvolatile storage means in each station; and
   (b) reading out the target-token rotation time stored in said storage means in order to reset the target-token rotation time at the time of re-entering said network after resetting the whole said network or departing each station from said network.

* * * * *

UNITED STATES PATENT AND TRADEMARK OFFICE
CERTIFICATE OF CORRECTION

PATENT NO. : 5,191,580

DATED : March 2, 1993

INVENTOR(S) : Y. Nakano et al.

It is certified that error appears in the above-identified patent and that said Letters Patent is hereby corrected as shown below:

Title Page:
  Item [75], the second inventor's name should be changed from "Yasuhira" to --Yasuhiro--.

Item [73], in the abstract, line 4, "seating" should be --setting--.

Col. 1, line 56, delete "5.".

Col. 2, line 54, "updata" should be --update--.

Col. 5, line 25, "oiut" should be --out--.

Signed and Sealed this

Fifteenth Day of March, 1994

Attest:

BRUCE LEHMAN

Attesting Officer      Commissioner of Patents and Trademarks